United States Patent [19]
Newton

[11] Patent Number: 4,930,307
[45] Date of Patent: Jun. 5, 1990

[54] DUCTED FAN GAS TURBINE ENGINE WITH SURGE CONTROLLER

[75] Inventor: Arnold C. Newton, Ockbrook, England

[73] Assignee: Rolls-Royce plc, London, England

[21] Appl. No.: 278,445

[22] Filed: Dec. 1, 1988

[30] Foreign Application Priority Data

Dec. 2, 1987 [GB] United Kingdom ................. 8728194

[51] Int. Cl.⁵ .............................................. F02K 1/64
[52] U.S. Cl. .................................. 60/226.1; 60/226.2; 239/265.31
[58] Field of Search ....................... 60/226.2, 229, 230, 60/242, 226.1; 239/265.31, 265.29, 265.27, 265.19; 244/110 B, 12.5

[56] References Cited

U.S. PATENT DOCUMENTS

| 3,500,645 | 3/1970 | Hom ...................................... 60/229 |
| 3,779,010 | 12/1973 | Chamay et al. ..................... 60/226.2 |
| 3,820,719 | 6/1974 | Clark .................................. 60/226.2 |

FOREIGN PATENT DOCUMENTS

| 2189550 | 4/1986 | United Kingdom . |
| 2203494 | 10/1988 | United Kingdom ............... 60/226.2 |

*Primary Examiner*—Donald E. Stout
*Attorney, Agent, or Firm*—Cushman, Darby & Cushman

[57] ABSTRACT

A ducted fan gas turbine engine includes for surge control capability in the form of a downstream fan cowl portion which can be moved to open a gap of variable magnitude. Fixed cowl portion has a resilient downstream edge which effects a good seal against blocker flaps when not in use. The blocker flaps are moved across the fan duct on the cowl portion moving a sufficient distance in a downstream direction.

3 Claims, 2 Drawing Sheets

DUCTED FAN GAS TURBINE ENGINE WITH SURGE CONTROLLER

This invention relates to a ducted fan gas turbine engine which includes a surge controller which in use enables control of the pressure ratio of the fan of the engine when in situ on an aircraft and thus, the tendency towards the onset of surge.

In the design of more powerful ducted fan gas turbine engines, the trend is to increase the diameter of the fan cowl so as to provide a fan duct of greater cross-sectional area and so enable the passage of a larger mass flow of fan air therethrough.

A drawback however, is that unless the cowl is reduced in thickness, the resulting increase in frontal area will induce a drag, the magnitude of which will be such as to reduce or negate any benefits which are derived by way of the increased thrust.

Reducing the cowl thickness, whilst avoiding the penalty referred to hereinbefore, results in less available space for the equipment which is needed to actuate and manipulate various cowl portions in order to modulate the thrust if in a controlled manner.

The present invention seeks to provide a ducted fan gas turbine engine including an improved cowl construction which incorporates a thin cross-section and means for controlling the fan pressure ratio and thereby controlling the tendency of an engine which includes the cowl.

According to the present invention a ducted fan gas turbine engine includes a surge controller comprising a cowl which surrounds a fan stage of the ducted fan gas turbine engine and includes an upstream portion adapted for fixing to and in coaxial spaced relationship with the core gas generator of the ducted fan gas turbine engine, a downstream portion supported from and adapted for axial movement relative to the upstream portion so as to create and close a gap therebetween, a plurality of blocker flaps pivotally fastened to and underlapping the downstream cowl portion and shaped so as to define a substantial portion of the leading edge thereof, and wherein the trailing edge of those portions of the fixed cowl portion which oppose the blocker flaps are convex in form and constructed from a resilient material and are deformable on engagement with the blocker flaps so as to effect a seal against egress of fan air, means for moving the downstream cowl portion and means for effecting pivoting of the blocker flaps across the fan duct.

The invention will now be described, by way of example and with reference to the accompanying drawings in which.

Figure 1:
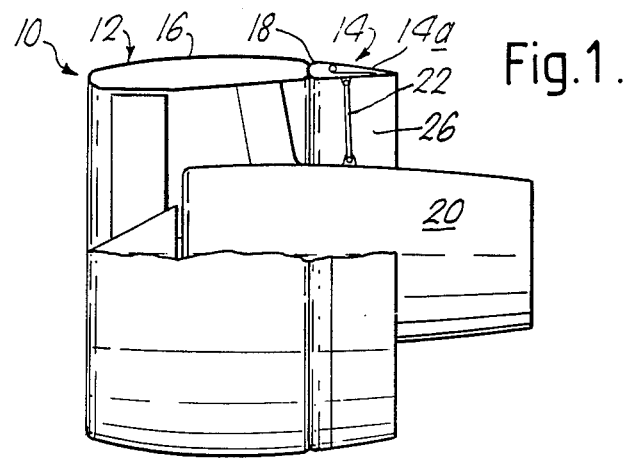
FIG. 1 is a diagrammatic view of a ducted fan gas turbine engine incorporating an embodiment of the present invention.

Referring to FIG. 1, a ducted fan gas turbine engine 10 of known general type, is provided with a fan cowl 12, the downstream end portion 14 of which can be caused to move axially relative to the fixed upstream cowl portion 16. The moving means are not shown, but may be ball screw and nut mechanisms or ram mechanisms, both of which means are well known in the ducted fan gas turbine engine field.

The cowl portion 14 is mostly made up of an annular portion 14a and a plurality of blocker flaps 18 which are arranged peripherally of the annular portion 14a. Each blocker flap 18 is connected to the casing of a core gas generator 20 via a link 22, and is pivotally connected to the annular cowl portion 14a in a manner described hereinafter.

Figure 2:
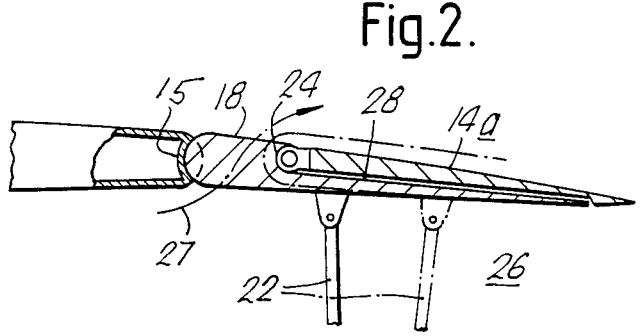
FIG. 2 is a view on line 2—2 in FIG. 6.

Referring now to FIG. 2. The downstream edge 15 of the cowl portion 16 is defined by a semi circular resilient member which effects a good sealing fit with the flaps 18. Each flap 18 has a step 24 in its outer surface and is hinged at that step, to the cowl portion 14a. The inner surface of the cowl portion 14a is recessed and the major portion of the length of each flap 18 substantially fills the recess and therefor, provides a portion of the outer flow surface of the fan duct 26 when the flaps 18 are inoperative as fan air blockers. There is however, a small gap 28 between each flap 18 and the cowl portion 14a.

The pressure ratio of the fan of an engine of the kind described herein has to be maintained within certain boundaries over the operating range of the engine. However, on take off of an associated aircraft when the engine controls are set to give full thrust, more air may be taken in by the fan, than is needed. This excess air must be dumped, or surge will occur, with perhaps total shut down of the engine being necessitated at this most critical stage in the flight regime. Thus if it is desired to maintain the pressure ratio on take off of an associated aircraft the outlet area is increased and, is effected by moving the downstream cowl portion 14a to the position shown in chain dotted lines and thus allowing escape of fan air as indicated by arrow 27. Each link 22 will then be caused to pivot through a short arc which takes it beyond a top dead center position. The flaps 18 will be caused to oscillate through a very small arc from and to their inoperative positions and this is enabled by the small gap 28.

Figure 3:
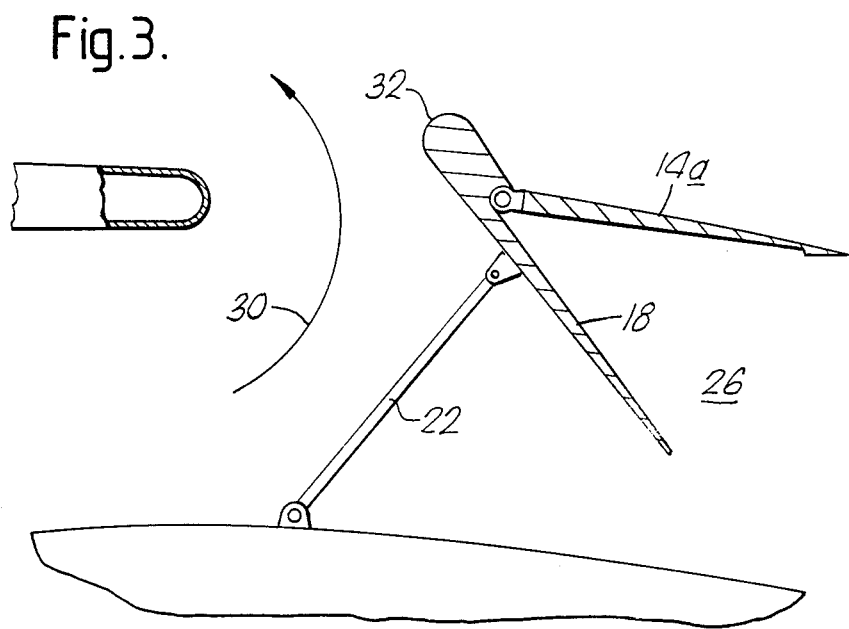
FIG. 3 is as FIG. 2 but with the corresponding parts in an operative mode.

Referring now to FIG. 3. If it is desired to reverse the flow of fan air as indicated by the arrow 30, the cowl portion 14a is translated rearwardly a distance sufficient to cause the links 22 to swing their respective blocker doors 18 across the fan duct 26. In the present example, the blocker doors 18 are proportioned so that their leading edges 32 project into the ambient airflow so as to improve the reversing effect on the fan airflow.

Figure 4:
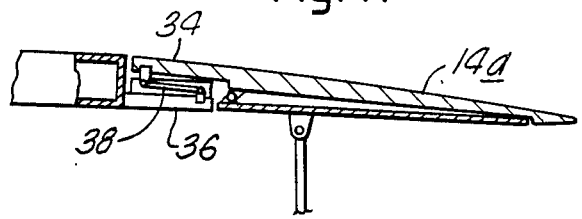
FIG. 4 is a view on line 4—4 in FIG. 6.

In a situation wherein a ducted fan gas turbine engine 10 is mounted on say, an aircraft wing, (not shown) at a position adjacent the aircraft fuselage (not shown), it may be necessary to shield the fuselage from the deflected fan air. Thus in FIG. 4, the cowl portion 14a includes local extensions 34 on its leading edge, which lie between pairs of adjacent blocker flaps 18. This is also seen in FIG. 6.

Figure 5:
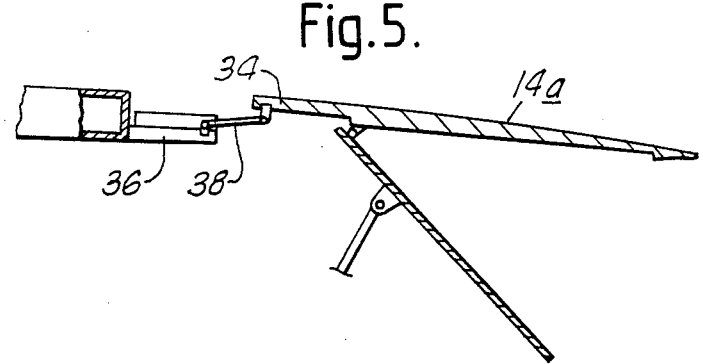
FIG. 5 is as FIG. 4 but with the corresponding parts in an operative mode.

Referring back to FIG. 4. The upstream cowl portion 16 has extensions 36 on its downstream edge which underlap the extensions 34. A space between each of adjacent extensions 34 and 36 is occupied by a translatable plate 38. The plate 38 is attached to both extensions 34 and 36 via track and roller mechanisms which are not shown in detail but which will be understood by the ordinary skilled person. Thus, when the cowl portion 14a is moved to modulate the thrust as depicted in FIG. 2, the movement will be relative to the plate 38. When the cowl portion 14a is moved to the position shown in FIG. 3, the plate 38 will be extended thereby to a position in which it spans a gap between the extremities of the extensions 34 and 36 as is shown in FIG. 5 and thus effectively blocks the gap at that position between the upstream cowl portion 16 and the downstream cowl portion 14a.

Figure 6:
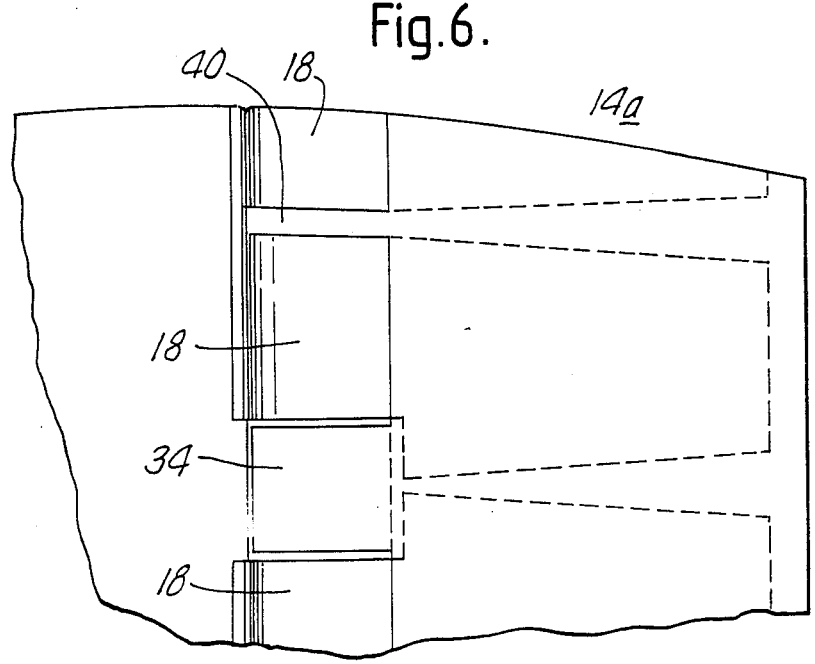
FIG. 6 is a part view in the direction of arrows 6 in FIG. 1.

Referring to FIG. 6. Further extension pieces 40 extend from the cowl portion 14a. The further extension pieces 40 are connected to the cowl portion 16 via a track and roller arrangement (not shown) in known manner. The extension pieces 40 also locate the nut (not shown) which engages a ball screw (not shown) which in turn is mounted in the cowl portion 16 for rotation by known means (not shown).

The arrangement described and illustrated in this specification enables the achievement of avoidance of the onset of surge, thrust reversal and local blockage of diverted fan air, using apparatus which occupies only a very small radial space relative to the number of functions that apparatus performs. The maintaining of a thin fan cowl is thus enabled.

I claim:
1. A ducted fan gas turbine engine including a fan surge controller comprising a cowl which surrounds a fan stage of the ducted fan gas turbine engine and includes an upstream portion fixedly supported in coaxial relationship with a core gas generator of the ducted fan gas turbine engine, a downstream portion supported from and adapted for axial movement relative to the upstream portion so as to create and close a gap therebetween, a plurality of blocker flaps pivotally fastened to and underlapping the downstream cowl portion and shaped so as to define a substantial portion of the leading edge thereof, and wherein the trailing edge of those portions of the fixed cowl portion which oppose the blocker flaps are convex in form and are deformable on engagement with the leading edges of the blocker flaps so as to effect a seal against egress of fan air, means for moving the downstream cowl portion and means for effecting pivoting of the blocker flaps across the fan duct, said means for moving the downstream cowl portion being operable to initially move the downstream cowl portion and associated blocker flaps to open a first gap while the blocker flaps are maintained in their non-blocking position, gap blocking means being provided in interspersed positional relationship with said blocker flaps.

2. A ducted fan gas turbine engine as claimed in claim 1 wherein the gap blocking means comprises extendable plates which are sandwiched between axial extensions fixed to the respective upstream and downstream cowl portions when not in use and connected to said extensions via track and roller mechanisms so that on initial movement of the downstream cowl portion to open said first gap, said downstream cowl portion moves relative to the said plates and on a further movement of the downstream cowl portion to increase the gap and to effect pivoting of the blocker flaps across the fan duct, the extension plates are moved thereby relative to the upstream cowl portion extensions to positions wherein they lie between respective upstream cowl portion extensions and downstream cowl extensions and so bridge the gap locally.

3. A ducted fan gas turbine engine as claimed in claim 1 wherein the means for moving the downstream cowl portion comprises ball screw and nut mechanisms wherein ball screws are mounted in the fixed upstream cowl portion for rotation about a fixed axis and located in ball nuts fixed in the downstream cowl portion.

* * * * *